June 25, 1946. J. R. O'DONNELL 2,402,570
HINGED CLAMPS
Filed Oct. 22, 1943

INVENTOR
JOHN R. O'DONNELL
BY
ATTORNEY

Patented June 25, 1946

2,402,570

UNITED STATES PATENT OFFICE 2,402,570

HINGED CLAMP

John R. O'Donnell, Brooklyn, N. Y., assignor to Econo Safety Devices Inc., Maspeth, N. Y., a corporation of New York Application October 22, 1943, Serial No. 508,002

1 Claim. (Cl. 287—54)

The present invention relates to a coupling, and is more particularly concerned with a coupling adapted to join tubular structures.

Couplings comprising double clamps each adapted to be attached to pipes are well known. Various types are used for attaching pipes to other pipes to provide structural supports of a diversity of design. One of the best known types of couplings is that used for joining tubular elements to build up supports for scaffolding. These couplings of the prior art are essentially a pair of clamps or clamping elements that are unitary, each clamping element comprising a split sleeve that is adapted to embrace a tubular element. In view of the fact that a split sleeve has inherent thickness, when the coupling is attached to a pair of tubular elements, the outer surfaces of these tubular elements are separated by the material from which the sleeves are made. It follows therefore, that as the thickness of the sleeves increases, the greater the distance between the outer surfaces of the tubular members. In structures for scaffolding, that are built up of individual tubular members joined together with the couplings of the prior art, a scaffold load applied to a horizontal tubular member attached to a vertical tubular member, causes a severe bending load on the carrying tubular element. This bending load is minimized in accordance with my invention through the use of a clamp or coupling that brings the outer surfaces of the joined tubular members in substantial contact.

I have found that the shortcomings of the prior art can be substantially completely avoided by providing a coupling that when applied to a pair of tubular elements, causes the outer surfaces of the tubular members making up the structure, to be in contact. In this manner the eccentricity of the loads, as it were, is minimized and the bending loads applied to the carrying tubular members are appreciably reduced.

It is an object of the present invention to provide a coupling adapted to be attached to pipes in a simple, efficient and economical manner.

It is another object of the present invention to provide a coupling adapted to join pipes by means of a pair of clamping elements that are unitary.

Other objects and advantages of the present invention will become apparent to those skilled in the art from the following description taken in conjunction with the accompanying drawing, in which.

Figure 1:
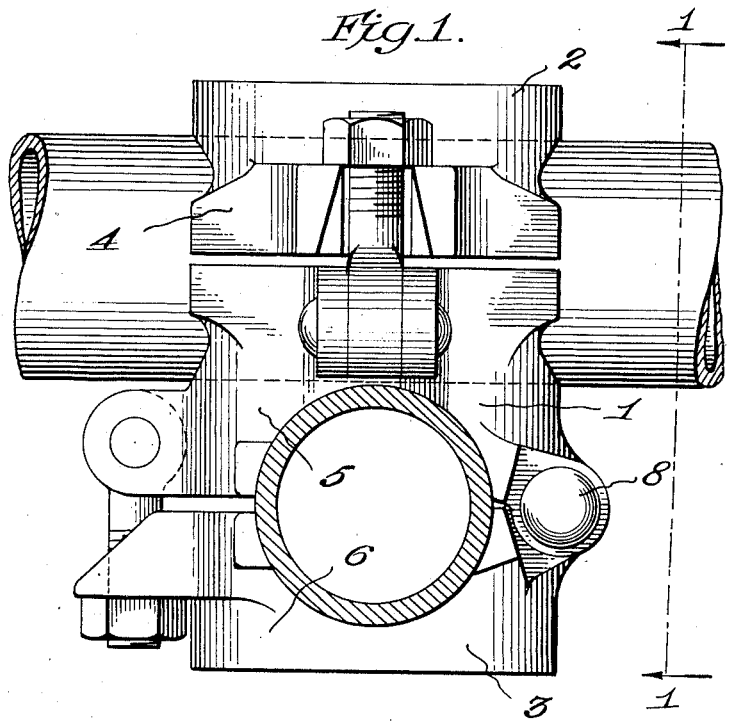
Fig. 1 is a plan view of the coupling embodying the present invention, joining two pipes.

Broadly stated, the present invention provides a coupling for joining pipes that includes a pair of unitary clamping elements. These clamping elements are constituted by one central leaf and two outside leaves, the said outside leaves being hingedly connected to the upper and lower portions of the central leaf along one pair of adjacent axial edges thereof. The inner surface of the outside leaves and the upper and lower surfaces of the central leaf are so shaped that they conform with the exterior surface of the tubular members which are to be joined. Thus, the outside leaves may be hingedly opened and closed about the circumferential surface of a portion of two tubular members to frictionally engage the same and to removably secure them together. The central leaf has an opening therein to allow the two clamped tubular members to contact each other in a region of their external surface.

The invention will now be described in connection with a preferred embodiment designated generally by reference character I in Fig. 1, but it is to be distinctly understood that the invention is applicable to couplings of any desired geometrical shape and to couplings adapted to the production and fabrication of any type of tubular or pipe structure.

Figure 2:
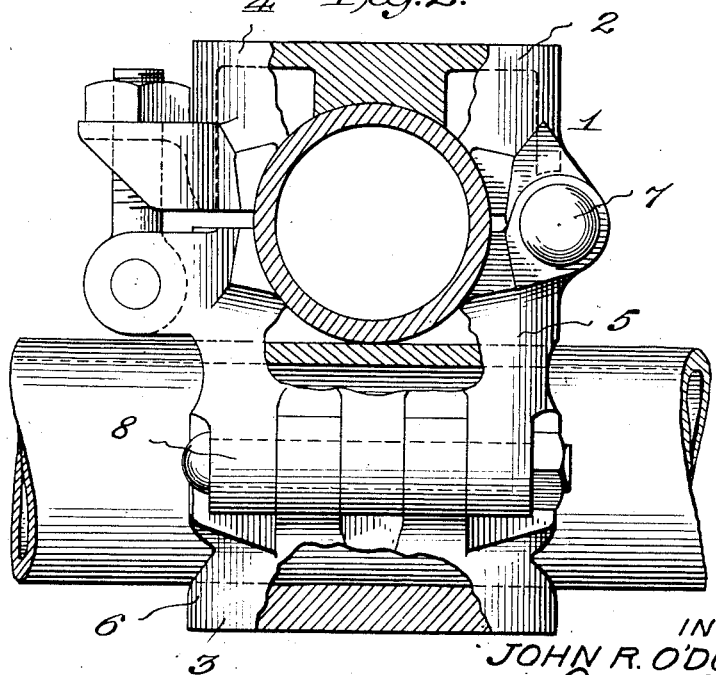
Fig. 2 is a view of the coupling shown in Fig. 1, along line I—I, but with portions of the material making up the coupling removed to show the outer surfaces of the pipes in contact.

Referring now more particularly to Figs. 1 and 2, the coupling I may consist of two clamping elements generally denoted by reference characters 2 and 3. These clamping elements are constituted by a central leaf 5 and two outside leaves 4 and 6. The inner surfaces of the outside leaves and the upper and lower surfaces of the central leaf are so shaped that the surfaces of the central leaf may cooperate with the corresponding surfaces of the outside leaves to clamp a pair of pipes. The two outside leaves are hingedly connected to the central leaf along adjacent axial edges at 7 and 8, respectively, to permit opening and closing thereof about a pipe. The remaining axial edges of the leaves are provided with means such as a hinged bolt and nut arrangement, to lock the outside leaves to the central leaf about a pipe, as shown.

To cause the exterior surfaces of the pipes being joined by the coupling to come in contact when the coupling is attached, central leaf 5 has an opening therein in the edges of which the upper and lower surfaces of said leaf meet. In other words, the clamping space enclosed by one outside leaf and the upper surface of the central leaf is in direct communication with the clamping space enclosed by the other outside leaf and the lower surface of the central leaf. In this manner, and as shown in Fig. 2, the outer surfaces of the pipes come in contact.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claim.

I claim:

A coupling for clamping together a pair of tubular members comprising in combination a central leaf, a pair of outside leaves hingedly connected to said central leaf, said central leaf having upper and lower surfaces cooperating with complementary surfaces of the said outside leaves to conform to the exterior surface of a pair of tubular members, means for securing the free edges of the outside leaves to the central leaf thereby to frictionally clamp said members, and an opening in the said central leaf to allow the clamped members to contact each other.

JOHN R. O'DONNELL.